US012726576B2

(12) United States Patent
Fukushima

(10) Patent No.: US 12,726,576 B2
(45) Date of Patent: Sep. 1, 2026

(54) SHEET CONVEYANCE APPARATUS, IMAGE READING APPARATUS, AND IMAGE FORMING APPARATUS

(71) Applicant: CANON KABUSHIKI KAISHA, Tokyo (JP)

(72) Inventor: Takayuki Fukushima, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/206,408

(22) Filed: May 13, 2025

(65) Prior Publication Data

US 2025/0373742 A1 Dec. 4, 2025

(30) Foreign Application Priority Data

Jun. 4, 2024 (JP) ................................ 2024-090563

(51) Int. Cl.
*H04N 1/00* (2006.01)
*G03G 15/22* (2006.01)

(52) U.S. Cl.
CPC ....... *H04N 1/00602* (2013.01); *G03G 15/228* (2013.01); *H04N 1/00538* (2013.01); *H04N 1/00557* (2013.01); *H04N 1/00559* (2013.01); *H04N 1/00628* (2013.01); *H04N 2201/0081* (2013.01)

(58) Field of Classification Search
CPC ........... B65H 2402/60; B65H 2403/73; H04N 1/00602; H04N 1/00538; H04N 1/0059; H04N 1/00628; H04N 2201/0081; H04N 1/00557; G03G 15/228
See application file for complete search history.

(56) References Cited

U.S. PATENT DOCUMENTS 5,575,464 A * 11/1996 Martinez ................ B65H 29/22 271/181
7,971,872 B2 * 7/2011 Omura .................... F16D 11/04 464/160
12,269,700 B2 * 4/2025 Taira ...................... B65H 5/062
2020/0010295 A1 * 1/2020 Hishinuma .......... B65H 3/0684

FOREIGN PATENT DOCUMENTS

JP 2015229538 A 12/2015

* cited by examiner

*Primary Examiner* — Howard J Sanders
(74) *Attorney, Agent, or Firm* — ROSSI, KIMMS & McDOWELL LLP

(57) ABSTRACT

A sheet conveyance apparatus includes a support unit including a guide surface, a roller unit including a roller member and a roller shaft supporting the roller member, a drive shaft provided in the support unit, a coupling configured to connect the drive shaft and the roller shaft, and a motor configured to supply a drive force to the roller shaft via the drive shaft and the coupling. A rib is disposed on an outer surface of the coupling. When the coupling is viewed from the conveyance path, the rib is inclined with respect to the sheet conveyance direction such that the rib becomes more distant from the roller member in a sheet width direction perpendicular to the sheet conveyance direction as the rib extends downstream in the sheet conveyance direction.

19 Claims, 10 Drawing Sheets

200
Df
317
43
40
102
315
315u
101
316
201
103

40
41
43
43a
44
44C
45
46
46a
46b
47
48
49
55
55a
Dw
Df
B

A
A
66
78a
Dw
Df
302
77
44C
78
65
76
64
315g
315

72
M
69
71
315
315g
Dw
315u
68
70
66e1
66e
78a
74
66d
66b
66a
66

66
46
47
Dw
78
40
76
55a
315
B
55
45
C

SHEET CONVEYANCE APPARATUS, IMAGE READING APPARATUS, AND IMAGE FORMING APPARATUS

BACKGROUND

Field of the Technology

This disclosure relates to a sheet conveyance apparatus that conveys a sheet, an image reading apparatus that reads an image from the sheet, and an image forming apparatus that forms an image on a recording material.

Description of the Related Art

Japanese Patent Laid-Open No. 2015-229538 describes an automatic document feeder that allows roller replacement by attaching and detaching a conveyance roller unit, which includes a pickup roller and a feed roller, with respect to a paper feed cover.

In the above literature, part of a coupling that connects a drive shaft and feed roller shaft of the conveyance roller unit supported by the paper feed cover is exposed to a conveyance path. Therefore, there is a possibility that conveyance failure may occur due to a leading edge of the conveyed sheet catching on the coupling.

SUMMARY

The present disclosure provides a sheet conveyance apparatus, an image reading apparatus, and an image forming apparatus that can reduce occurrence of conveyance failure.

An aspect of the present disclosure provides a sheet conveyance apparatus including a support unit including a guide surface configured to form a conveyance path through which a sheet passes, a roller unit including a roller member configured to convey the sheet in a sheet conveyance direction through the conveyance path and a roller shaft supporting the roller member, the roller unit being supported by the support unit in a detachable manner, a drive shaft provided in the support unit, a coupling configured to connect the drive shaft and the roller shaft, and a motor configured to supply a drive force to the roller shaft via the drive shaft and the coupling, wherein at least part of the coupling is exposed to the conveyance path, wherein a rib is disposed on an outer surface of the coupling, and wherein, when the coupling is viewed from the conveyance path, the rib is inclined with respect to the sheet conveyance direction such that the rib becomes more distant from the roller member in a sheet width direction perpendicular to the sheet conveyance direction as the rib extends downstream in the sheet conveyance direction.

Another aspect of the present disclosure provides an image reading apparatus including a support unit including a guide surface configured to form a conveyance path through which a sheet passes, a roller unit including a roller member configured to convey the sheet in a sheet conveyance direction through the conveyance path and a roller shaft supporting the roller member, the roller unit being supported by the support unit in a detachable manner, a drive shaft provided in the support unit, a coupling configured to connect the drive shaft and the roller shaft, a motor configured to supply a drive force to the roller shaft via the drive shaft and the coupling, and a read sensor configured to read an image of the sheet conveyed by the roller member, wherein at least part of the coupling is exposed to the conveyance path, wherein a rib is disposed on an outer surface of the coupling, and wherein, when the coupling is viewed from the conveyance path, the rib is inclined with respect to the sheet conveyance direction such that the rib becomes more distant from the roller member in a sheet width direction perpendicular to the sheet conveyance direction as the rib extends downstream in the sheet conveyance direction.

Another aspect of the present disclosure provides an image forming apparatus including a support unit including a guide surface configured to form a conveyance path through which a sheet passes, a roller unit including a roller member configured to convey the sheet in a sheet conveyance direction through the conveyance path and a roller shaft supporting the roller member, the roller unit being supported by the support unit in a detachable manner, a drive shaft provided in the support unit, a coupling configured to connect the drive shaft and the roller shaft, a motor configured to supply a drive force to the roller shaft via the drive shaft and the coupling, a read sensor configured to read an image of the sheet conveyed by the roller member, and an image forming unit configured to form an image on a recording material based on image information acquired by the read sensor, wherein at least part of the coupling is exposed to the conveyance path, wherein a rib is disposed on an outer surface of the coupling, and wherein, when the coupling is viewed from the conveyance path, the rib is inclined with respect to the sheet conveyance direction such that the rib becomes more distant from the roller member in a sheet width direction perpendicular to the sheet conveyance direction as the rib extends downstream in the sheet conveyance direction.

Features of the present disclosure will become apparent from the following description of embodiments with reference to the attached drawings. The following description of embodiments are described by way of example.

DESCRIPTION OF THE EMBODIMENTS

Hereinafter, with reference to drawings, an embodiment according to this disclosure will be described.

First, using FIGS. 1 to 3, an image forming apparatus 100 and an image reading apparatus 101 according to one embodiment will be described. This image forming apparatus 100 is a color multifunction machine equipped with an image forming unit 120 of a tandem type intermediate transfer system as an image forming means. To be noted, the image forming apparatus 100 is merely an example of an image forming apparatus to which the technology of this disclosure can be applied. The "image forming apparatus" may be a single-function printer or a commercial-grade large-scale printing machine. In addition, an image forming means may also employ a direct transfer method, and is not limited to an electrophotographic system; for example, it may utilize an inkjet printing mechanism.

Figure 1:
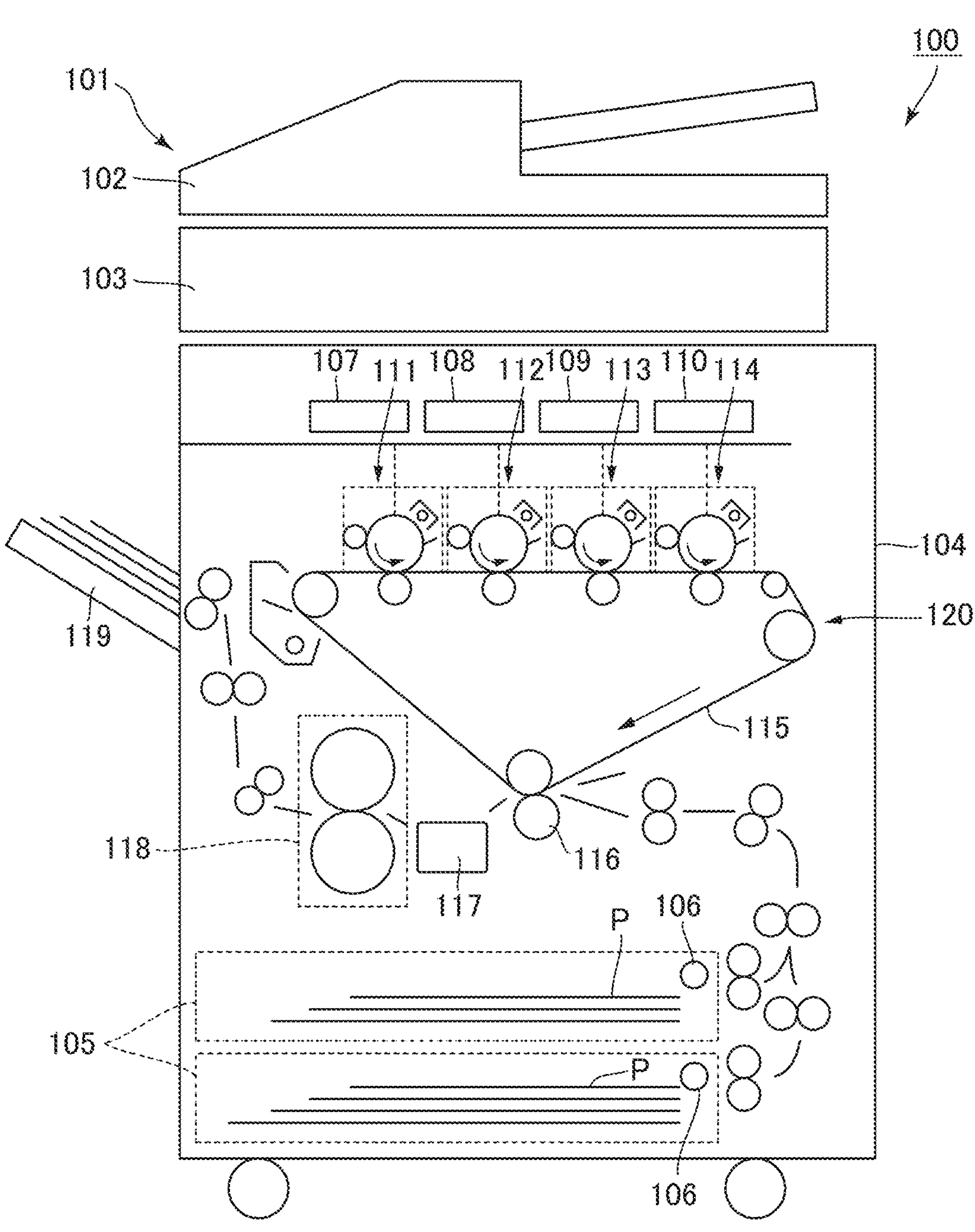
FIG. 1 is a schematic diagram illustrating an image forming apparatus according to an embodiment.

As illustrated in FIG. 1, the image forming apparatus 100 includes an image forming apparatus body 104 and the image reading apparatus 101 arranged on top of the image forming apparatus body 104. In an interior of the image forming apparatus body 104, an image forming unit 120, feed cassettes 105 that store a recording material P, feed rollers 106 that feed the recording material P, and the like are arranged.

The image forming unit 120 includes four process units 111, 112, 113, and 114 (image forming stations) and laser scanners 107, 108, 109, and 110, serving as exposure means. In addition, the image forming unit 120 includes an intermediate transfer belt 115, a secondary transfer roller 116, and a fixing unit 118.

Each of the process units 111 to 114 includes a photosensitive drum, serving as an image bearing member, a charge unit that interacts with the photosensitive drum, a developing unit, and a cleaning unit. The intermediate transfer belt 115, serving as an intermediate transfer member, is stretched over a plurality of rollers. The four process units 111 to 114 are arranged in line along the intermediate transfer belt 115. In addition, a transfer portion (secondary transfer portion), in which the transfer of a toner image is performed, is formed as a nip portion between the secondary transfer roller 116 and the intermediate transfer belt 115.

The fixing unit 118 includes a heating member such as a fixing roller, a pressing member such as a pressing roller, and a heating source such as a halogen lamp for heating the heating member. A fixing nip is formed between the heating and pressing members.

An overview of an image forming operation that is a sequence of operations which the image forming apparatus 100 performs to form an image on the recording material P will be described. For example, in a case where a user presses a copy execution button in a state in which a document is set on the image reading apparatus 101, a control unit of the image forming apparatus 100 starts an image reading operation using the image reading apparatus 101 and the image forming operation using the image forming apparatus body 104. The control unit forms the image on the recording material P based on image information acquired by executing the image reading operation using the image reading apparatus 101. The configuration and the image reading operation of the image reading apparatus 101 will be described below.

In the image forming operation, the photosensitive drum of each of the process units 111 to 114 and the intermediate transfer belt 115 are rotatably driven. The charge unit uniformly charges a surface of the photosensitive drum. The laser scanners 107 to 110 are driven based on image data, in which the image information is decomposed into yellow, magenta, cyan, and black components, and emit light onto the photosensitive drums. Thereby, the photosensitive drums are exposed, and electrostatic latent images are formed on the surfaces of the photosensitive drums. The developing unit develops the electrostatic latent image using toner, serving as developer. Thereby, monochromatic toner images of yellow, magenta, cyan, and black are formed on the four photosensitive drums. By primarily transferring these monochromatic toner images onto the intermediate transfer belt 115 in an overlapping manner, a full color toner image (hereinafter, simply referred to as a toner image) is formed on the intermediate transfer belt 115.

In parallel with the formation of the toner image, the recording material P is fed one sheet at a time from the feed cassette 105 to the secondary transfer portion by the feed roller 106. In the secondary transfer portion, the toner image is secondarily transferred from the intermediate transfer belt 115 to the recording material P by applying voltage to the secondary transfer roller 116. The recording material P which has passed through the secondary transfer portion is sent to the fixing unit 118, and heat and pressure are applied to the toner image. Thereby, the toner image is fixed on the recording material P. The recording material P which has passed through the fixing unit 118 is discharged to the outside of the image forming apparatus body 104, and is supported on a sheet discharge tray 119.

Image Reading Apparatus

Next, using FIGS. 1 to 3, the image reading apparatus 101 will be described. The image reading apparatus 101 includes a reader 103 and an automatic document feeder (hereinafter, referred to as an ADF) 102. The reader 103 is mounted on top of the image forming apparatus body 104. The ADF 102 is supported by the reader 103, and is disposed in an openable and closable manner with respect to the reader 103. The ADF 102 is an example of a sheet conveyance apparatus that conveys a sheet (document).

Figure 2:
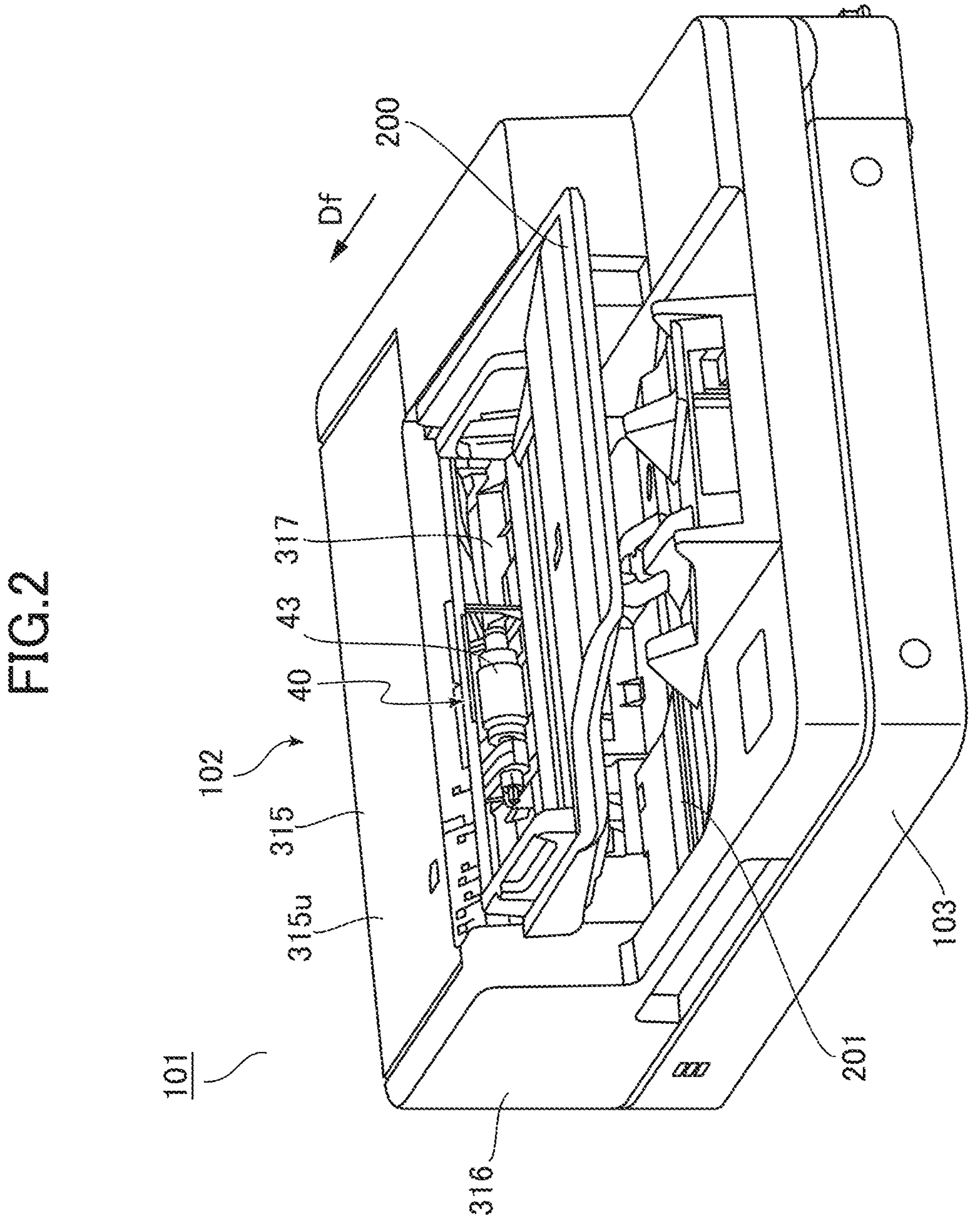
FIG. 2 is a perspective view illustrating an image reading apparatus according to the embodiment.
Figure 3:
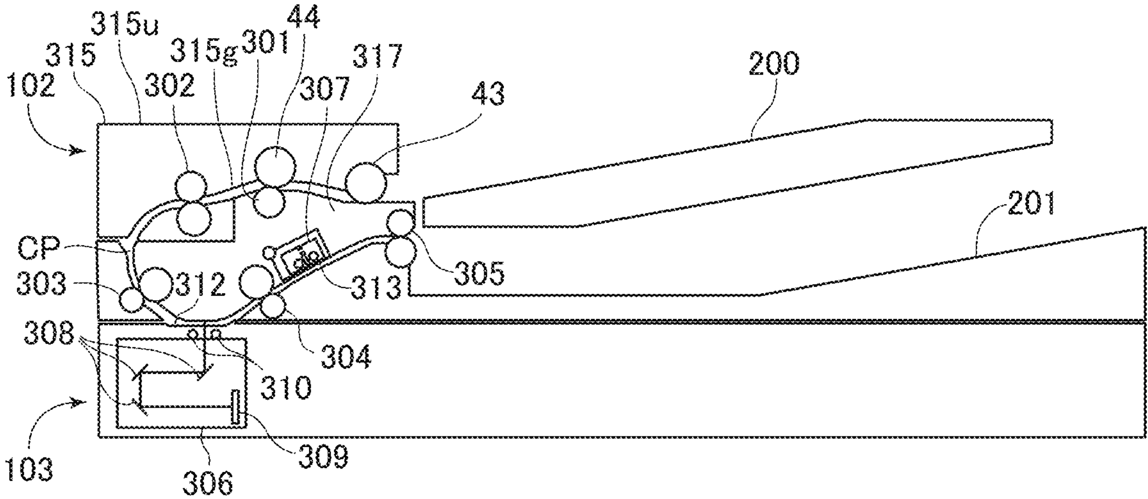
FIG. 3 is a schematic diagram illustrating the image reading apparatus according to the embodiment.

As illustrated in FIGS. 2 and 3, the reader 103 includes a front surface reading unit 306 and a document feeding-reading glass 312. In addition, the ADF 102 includes a document tray 200, an ADF main body 316, an opening/closing cover 315, a separation guide 317, a document discharge tray 201, a back surface reading unit 307, and a document feeding-reading glass 313. Further, the ADF 102 includes a pickup roller 43, a feed roller 44, a separation roller 301, an extraction roller pair 302, a first read roller pair 303, a second read roller pair 304, and a document discharge roller pair 305. The pickup roller 43 and the feed roller 44 constitute part of a conveyance roller unit 40, described below.

The front and back surface reading units 306 and 307 are examples of a read sensor or reading means that reads the image information from the sheet. In this embodiment, the front surface reading unit 306 is an image sensor unit of a charge-coupled device (CCD) method, and the back surface reading unit 307 is an image sensor unit of a contact image sensor (CIS) type. The front surface reading unit 306 includes a sensor board 309, in which photodetectors are arranged, a light source 310 for emitting the light to the document, and a plurality of mirrors 308 that form a reduction optical system for creating an optical image of the document on a light receiving surface of the sensor board. The back surface reading unit 307 includes a complementary metal-oxide-semiconductor (CMOS) sensor board, a light source for emitting the light to the document, and an equal magnification optical system for creating the optical image of the document on a light receiving surface of the sensor board.

Among conveyance rollers, which the ADF 102 includes, the pickup roller 43, the feed roller 44, and one side of rollers of the extraction roller pair 302 are supported by the opening/closing cover 315. The other side of the rollers of the extraction roller pair 302, the first read roller pair 303, the second read roller pair 304, and the document discharge roller pair 305 are supported by the ADF main body 316. In addition, the separation roller 301 is supported by the separation guide 317 attached to the ADF main body 316.

The ADF main body 316 is a first unit or a main unit that is openable and closable with respect to the reader 103. The document tray 200 and the document discharge tray 201 are supported by the ADF main body 316. The opening/closing cover 315 is a second unit (opening/closing member, opening/closing unit) that is movably (openably/closably) supported by the ADF main body 316.

The opening/closing cover 315 includes a guide surface 315*g* that forms at least part of a conveyance path (document conveyance path CP), through which the document passes, with a main body side guide surface disponed on the ADF main body 316. The opening/closing cover 315 is movable (openable/closable) between a closed position to form the document conveyance path CP and an open position to open the document conveyance path CP. In addition, the opening/closing cover 315 includes an exterior surface 315*u* that forms part of an upper surface of the ADF 102 in a state in which the opening/closing cover 315 is in the closed position. The opening/closing cover 315 of this embodiment pivots around a center line extending in a sheet width direction using a shaft portion disposed at an end portion on the left side in FIG. 3 of the opening/closing cover 315 as a fulcrum.

The pickup roller 43 is a pickup member that advances the document from the document tray 200, serving as a sheet support portion on which the document is supported. The feed roller 44 is a feed member that feeds the document advanced from the document tray 200. The separation roller 301 comes into contact with the feed roller 44 in a state in which the opening/closing cover 315 is in the closed state, and forms a separation nip.

The separation roller 301 is an example of a separation member that separates the sheet by applying a friction force onto the sheet. The separation roller 301 could be a roller member that is supported by a shaft member secured to the ADF main body 316 via a torque limiter. In addition, the separation roller 301 could be a roller of a retard drive method that receives a drive force in a direction (clockwise direction in FIG. 3) opposite to a document conveyance direction (sheet conveyance direction Df) in the separation nip via a torque limiter. In addition, instead of the separation roller 301, a pad-shaped elastic member (rubber pad) that comes into contact with the feed roller 44 could be used as the separation member.

The image reading apparatus 101 can perform the image reading operation (document feeding-reading operation) to read the image information of the document using the front and back surface reading units 306 and 307 while conveying the document one sheet at a time by the ADF 102. When the image reading operation is started, the pickup roller 43 rotates in a state of being in contact with the uppermost sheet on the document tray 200, and delivers the document from the document tray 200. The feed roller 44 further conveys the delivered document in the sheet conveyance direction Df. The separation roller 301 applies the friction force in a direction opposite to the sheet conveyance direction Df onto the document in the separation nip. In a case where a plurality of sheets of the document enter the separation nip, the separation roller 301 restricts the passage of a sheet of document through the separation nip, other than the one which is in contact with the feed roller 44. Thereby, the document passes through the separation nip in a state in which the document is separated into a single sheet.

The document that has passed through the separation nip is sequentially conveyed by the extraction roller pair 302, the first read roller pair 303, and the second read roller pair 304. During this process, the front and back surface reading units 306 and 307 optically scan either side of the document through the document feeding-reading glasses 312 and 313, and convert them into electronic signals. Thereby, the image information is acquired as electronic image data. The document whose image information has been read is discharged from the ADF main body 316 by the document discharge roller pair 305, and is supported on the document discharge tray 201.

To be noted, the image reading apparatus 101 can also read the image information from a stationary document placed on the reader 103. In this case, after opening the ADF 102 and placing to set the document on a platen glass of the reader 103, the user closes the ADF 102, and instructs the execution of the reading operation. Thereby, the front surface reading unit 306 acquires the image information by optically scanning the document while moving in a sub-scanning direction.

Conveyance Roller Unit

Using FIG. 4, the conveyance roller unit 40 will be described. In the following description, the conveyance direction of the document conveyed by the pickup roller 43 and the feed roller 44 is referred to as the sheet conveyance direction Df. A direction perpendicular to the sheet conveyance direction Df and aligned with one side of the document is referred to as the sheet width direction Dw. The sheet width direction Dw is substantially parallel to a rotational axis direction of each of the feed roller 44, a feed roller shaft 46, a drive shaft 68, and a coupling member 66.

Figure 4:
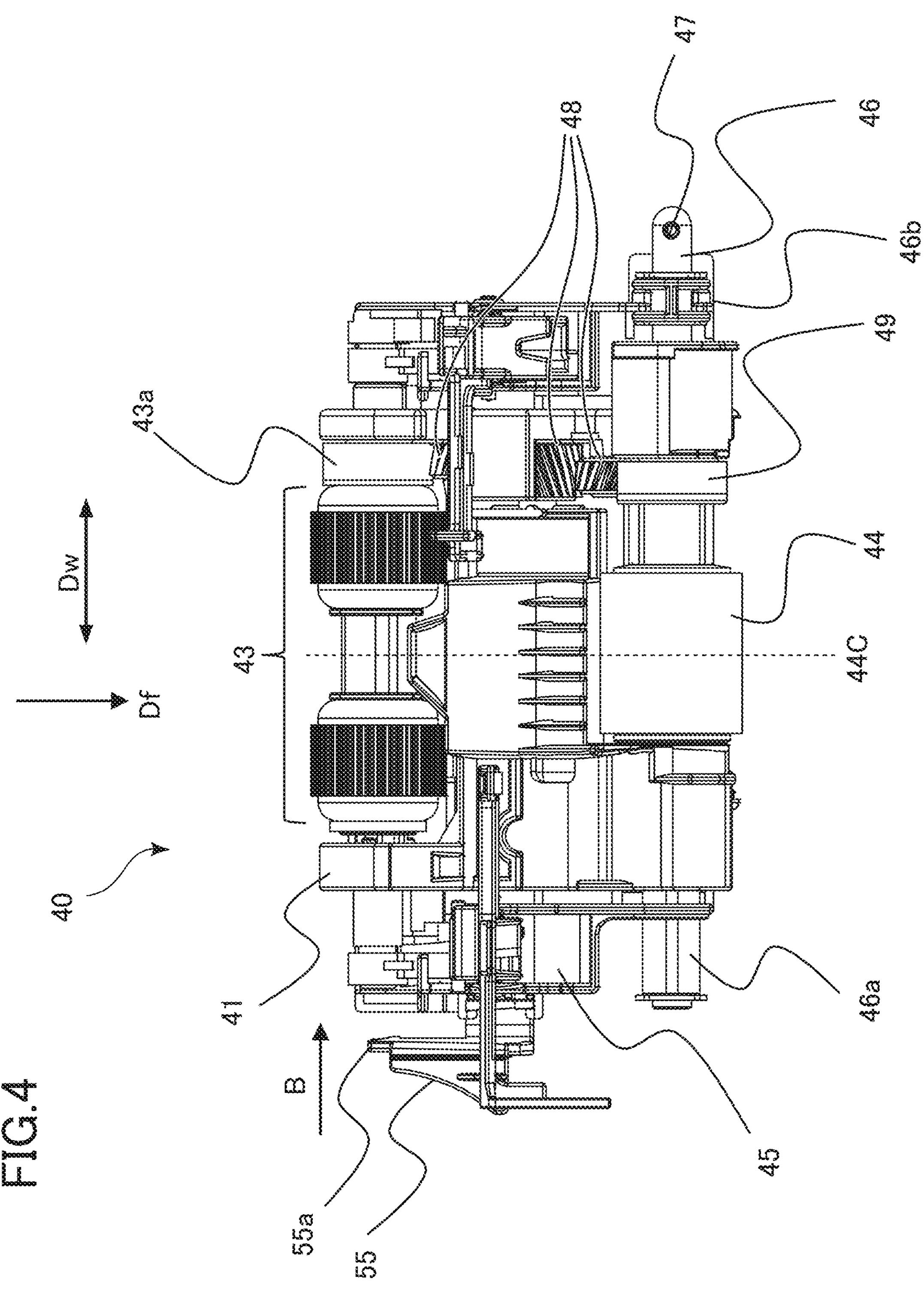
FIG. 4 is a diagram illustrating a conveyance roller unit according to the embodiment.

As illustrated in FIG. 4, the conveyance roller unit 40 includes the pickup roller 43, the feed roller 44, a holder member 45, the feed roller shaft 46, and a swing arm 41. The feed roller 44 is an example of a roller member that conveys the sheet through the conveyance path (document conveyance path CP). The feed roller shaft 46 is an example of a roller shaft that supports the roller member. In addition, the conveyance roller unit 40 is a replaceable unit that is supported by the opening/closing cover 315, serving as a support unit, in a detachable manner.

The pickup roller 43 is supported by the swing arm 41 in a rotatable manner. The swing arm 41 is supported by the holder member 45, and can swing around the rotational axis of the feed roller 44 as a center with respect to the holder member 45. Due to a swing of the swing arm 41, the pickup roller 43 can move (can ascend and descend) to come into contact with and be separated from the document on the document tray 200.

The feed roller 44 is attached to the feed roller shaft 46 via a one-way clutch. The feed roller shaft 46 receives a drive force from the coupling member 66 (FIG. 5), described below, disposed on the opening/closing cover 315. By transmitting the drive force received by the feed roller shaft 46 to the feed roller 44 via the one-way clutch, the feed roller 44 rotates in a direction aligned with the sheet conveyance direction Df. That is, the one-way clutch restricts the feed roller 44 from rotating in a direction opposite to the sheet conveyance direction Df, and integrally rotates the feed roller shaft 46 and the feed roller 44. On the other hand, in a case where the document passes through the separation nip in a state in which the input of the drive force to the feed roller shaft 46 is stopped, the one-way clutch permits the feed roller 44 to idle in a direction aligned with the sheet conveyance direction Df by allowing relative rotation with respect to the feed roller shaft 46.

The feed roller shaft 46 is held by the holder member 45 via a first shaft receiving portion 46*a* (first bearing portion) and a second shaft receiving portion 46*b* (second bearing portion). The feed roller shaft 46 can rotate around the rotational axis in the sheet width direction Dw. The first shaft receiving portion 46*a* receives and rotatably supports an end on one side of the feed roller shaft 46 in the sheet width direction Dw, and the second shaft receiving portion 46*b* receives and rotatably supports an end on the other side of the feed roller shaft 46 in the sheet width direction Dw.

A spring pin 47, serving as a first engagement portion (drive input portion) that engages with the coupling member 66, is disposed at one end of the feed roller shaft 46. The spring pin 47 will be described below.

In the holder member 45, a separation arm 55, serving as an elastically deformable operation portion, is disposed. The separation arm 55 is configured to undergo elastic deformation in an arrow B direction when the user pinches and operates the separation arm 55 during attaching or detaching the conveyance roller unit 40. The separation arm 55 is equipped with an engaged portion 55*a* that is engaged by a separation arm retaining portion 76, described below, disposed on the opening/closing cover 315.

The feed roller shaft 46 and the pickup roller 43 are connected via a gear train (43*a*, 48, 49). In particular, the input gear 43*a* is formed at an end portion of the pickup roller 43. The input gear 43*a* is connected to the drive gear 49, which is coaxially arranged with the feed roller shaft 46, via the plurality of idler gears 48 rotatably supported by the swing arm 41. The drive gear 49 is connected to the feed roller shaft 46 via a one-way clutch. This one-way clutch transmits the drive force, which the feed roller shaft 46 receives, to the pickup roller 43, and rotates the pickup roller 43 in the direction aligned with the sheet conveyance direction Df. On the other hand, this one-way clutch allows the pickup roller 43 to idle in the direction aligned with the sheet conveyance direction Df in the state in which the input of the drive force to the feed roller shaft 46 is stopped.

The swing arm 41 and the feed roller shaft 46 are connected via a spring clutch attached to an outer circumference of the feed roller shaft 46. When the drive force that rotates the feed roller 44 in the direction aligned with the sheet conveyance direction Df is applied to the feed roller shaft 46, a downward torque acts on the swing arm 41 through the spring clutch to cause the swing arm 41 to descend, and the pickup roller 43 comes into contact with the document. When the input of the drive force to the feed roller shaft 46 is stopped, the swing arm 41 ascends, for example, by an urging force of an urging member (return spring) disposed between the swing arm 41 and the holder member 45. To be noted, instead of the spring clutch, the swing arm 41 can be elevated and lowered using an independent drive source, such as, for example, a solenoid.

Support Configuration of Conveyance Roller Unit

Figure 5:
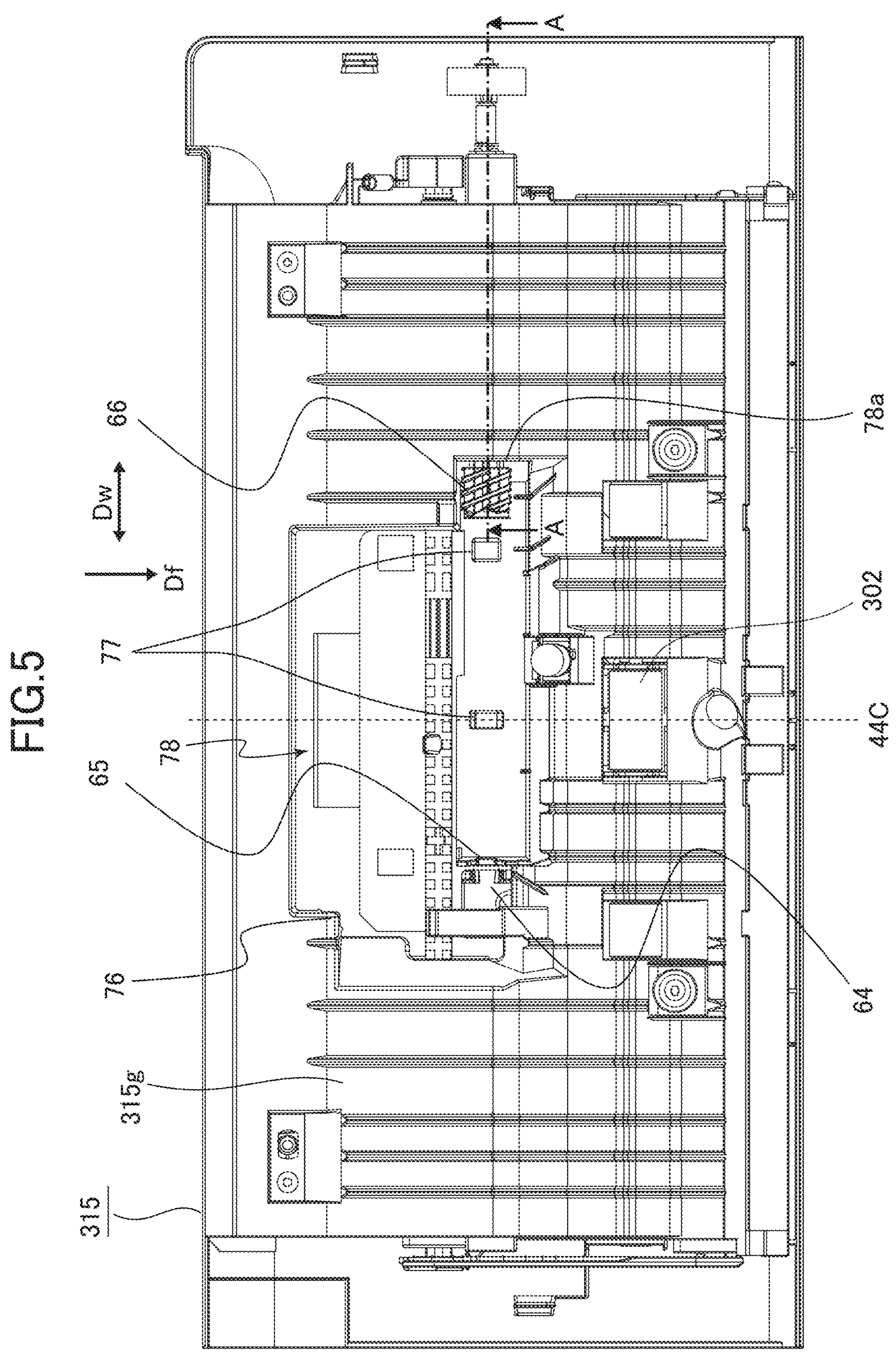
FIG. 5 is a diagram illustrating an opening/closing cover according to the embodiment when viewed from a side of a document conveyance path.

Next, using FIG. 5, a support configuration of the conveyance roller unit 40 will be described. FIG. 5 is a diagram illustrating the opening/closing cover 315 as viewed from a side of the guide surface 315*g*, with the conveyance roller unit 40 detached.

In the opening/closing cover 315, a shaft-receiver support portion 65, a shaft-receiver pinch portion 64 (pinch portion), the separation arm retaining portion 76, projection portions 77, and a recessed portion 78 are disposed.

The recessed portion 78 is in a recessed shape that is recessed from the guide surface 315*g*. In a state in which the conveyance roller unit 40 is attached to the opening/closing cover 315, at least part of the conveyance roller unit 40 is enclosed in the recessed portion 78. The shaft-receiver support portion 65, the shaft-receiver pinch portion 64, and the projection portions 77 are arranged in the recessed portion 78. In addition, the separation arm retaining portion 76 has a canopy-like shape formed in a peripheral portion of the recessed portion 78.

Figure 10:
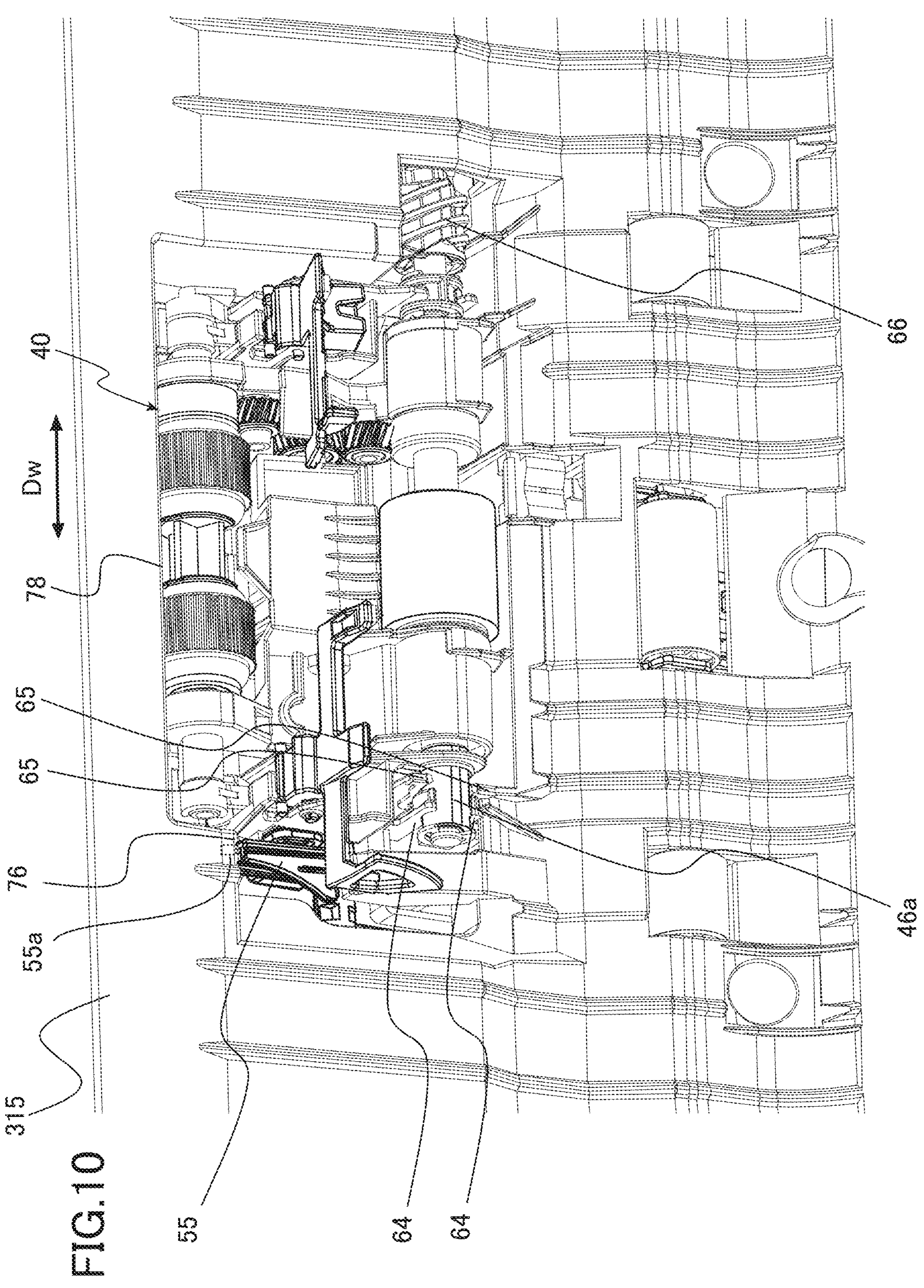
FIG. 10 is a diagram illustrating the method for attaching and detaching the conveyance roller unit according to the embodiment.

The shaft-receiver support portion 65 supports the first shaft receiving portion 46*a* of the conveyance roller unit 40 (also refer to FIG. 10). When viewed in the sheet width direction Dw, the first shaft receiving portion 46*a* is formed in a substantially arcuate form (substantially semicircular form). The projection portions 77 are engagement portions that engage with a groove shape disposed on a back surface (surface on the far side in FIG. 4) of the holder member 45. In this embodiment, two projection portions 77 aligned in the sheet width direction Dw are arranged. In this embodiment, the shaft-receiver support portion 65 engages with the first shaft receiving portion 46*a* at an end on one side in the sheet width direction Dw, and the projection portions 77 engage with the groove shape of the holder member 45 at positions different from the shaft-receiver support portion 65 in the sheet width direction Dw. Thereby, the position of the conveyance roller unit 40 in the sheet conveyance direction Df and the sheet width direction Dw is determined.

The shaft-receiver pinch portion 64 is arranged adjacent to the shaft-receiver support portion 65 in the sheet width direction Dw. In the state in which the conveyance roller unit 40 is attached to the opening/closing cover 315, the shaft-receiver pinch portion 64 pinches the first shaft receiving portion 46*a*. Similar to the shaft-receiver support portion 65, the shaft-receiver pinch portion 64 has an arcuate form, and is elastically deformable. The shaft-receiver pinch portion 64 includes two arms, and the first shaft receiving portion 46*a* is held in a space formed between the two arms. In addition, the inlet width of the shaft-receiver pinch portion 64 is narrower than an outer diameter of the first shaft receiving portion 46*a*. In a case where the conveyance roller unit 40 is attached to the opening/closing cover 315, due to the elastic deformation of the shaft-receiver pinch portion 64, the first shaft receiving portion 46*a* is pushed into the inside of the shaft-receiver pinch portion 64. In addition, in a case where the conveyance roller unit 40 is detached from the opening/closing cover 315, due to the elastic deformation of the shaft-receiver pinch portion 64, the withdrawal of the first shaft receiving portion 46*a* from the shaft-receiver pinch portion 64 is allowed.

The separation arm retaining portion 76 is arranged near the shaft-receiver pinch portion 64, and is formed by a part of the guide surface 315*g*. The separation arm retaining portion 76 restricts the movement of the conveyance roller unit 40 in a direction of disengagement from the recessed portion 78 by retaining the engaged portion 55*a* (FIG. 4) of the separation arm 55, which is a part of the conveyance roller unit 40. In addition, when the user operates the separation arm 55, due to the elastic deformation of the separation arm 55, the engaged portion 55*a* moves in the arrow B direction, and the withdrawal from the separation arm retaining portion 76 is allowed.

Coupling Member

Figure 6:
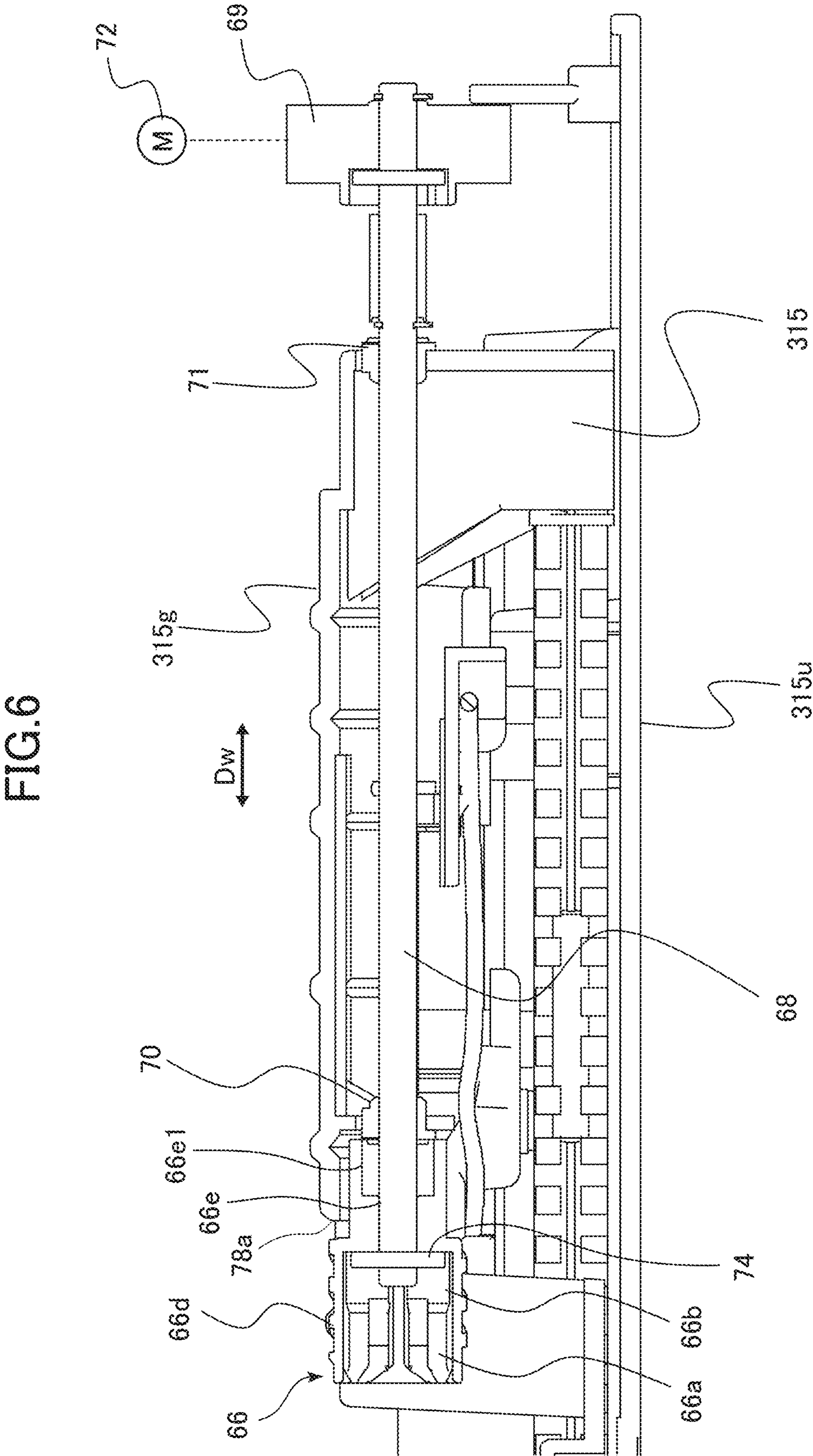
FIG. 6 is a cross-sectional view illustrating the opening/closing cover according to the embodiment.

The coupling member 66 serving as a coupling and its surrounding configurations will be described primarily using FIG. 6. FIG. 6 is a cross-sectional view illustrating the opening/closing cover 315 taken along the line A-A of FIG. 5.

As illustrated in FIG. 6, the coupling member 66, the drive shaft 68, and a feed gear 69 are disposed on the opening/closing cover 315. The drive shaft 68 is a shaft member extending in the sheet width direction Dw.

The feed gear 69 is attached to one end of the drive shaft 68 in the sheet width direction Dw, and the coupling member 66 is attached to the other end of the drive shaft 68 in the sheet width direction Dw. The drive shaft 68, the coupling member 66, and the feed gear 69 rotate integrally around an axis extending in the sheet width direction Dw.

The feed gear 69 is connected to a feed motor 72 via a transmission mechanism such as a gear train or a belt. The feed motor 72 is a drive source that supplies the drive force to the conveyance roller unit 40 via the drive shaft 68 and the coupling member 66. The feed motor 72 is arranged in the ADF main body 316. The drive shaft 68 is rotatably supported with respect to the opening/closing cover 315 by bearings 70 and 71, which are secured to the opening/closing cover 315. Most of the drive shaft 68 is arranged in a space between the guide surface 315*g* of the opening/closing cover 315 and the exterior surface 315*u*.

The coupling member 66 connects the drive shaft 68 and the feed roller shaft 46 of the conveyance roller unit 40 in the state in which the conveyance roller unit 40 is attached to the opening/closing cover 315. The coupling member 66 of this embodiment is a drive output portion that transmits the drive force to the conveyance roller unit 40.

In this embodiment, the spring pin 47 (FIG. 4), serving as a first engagement portion, is disposed at one end of the feed roller shaft 46. An end portion of the feed roller shaft 46, which includes the spring pin 47, is a drive input portion to which the drive force is input via the coupling member 66.

The spring pin 47 is attached in a hole portion of the feed roller shaft 46 to project outward from an outer surface of the feed roller shaft 46 toward both sides in directions perpendicular to the sheet width direction Dw. When the spring pin 47 engages with a first cross groove 66*a* (FIG. 7), described below, inside of the coupling member 66, the drive shaft 68 and the feed roller shaft 46 are connected. To be noted, the "first engagement portion" is not limited to the spring pin 47, and may, for example, be a key shape that is integrally formed with the feed roller shaft 46.

As illustrated in FIG. 6, the coupling member 66 is secured to the drive shaft 68 via a parallel pin 74, serving as a second engagement portion. The parallel pin 74 is inserted into a through hole disposed in the drive shaft 68, and projects from an outer surface of the drive shaft 68 in the direction perpendicular to the sheet width direction Dw. When the parallel pin 74 engages with a second cross groove 66*b* (FIG. 8C), described below, which is inside of the coupling member 66, the coupling member 66 and the drive shaft 68 are connected so as not to allow relative rotation. To be noted, the "second engagement portion" is not limited to the parallel pin 74, and may, for example, be a key shape that is integrally formed with the drive shaft 68.

As illustrated in FIGS. 5 and 6, in a case where the opening/closing cover 315 is viewed from a side of the document conveyance path CP, at least part of the coupling member 66 is not covered by the guide surface 315*g*. That is, at least part of the coupling member 66 is exposed to the document conveyance path CP. In this embodiment, the coupling member 66 is exposed inside of a notch portion 78*a* of the guide surface 315*g* which is continuous with the recessed portion 78 disposed in the opening/closing cover 315. To be noted, the entirety of the coupling member 66 may be exposed when viewed from the side of the document conveyance path CP.

Shape of Coupling

Figure 7:
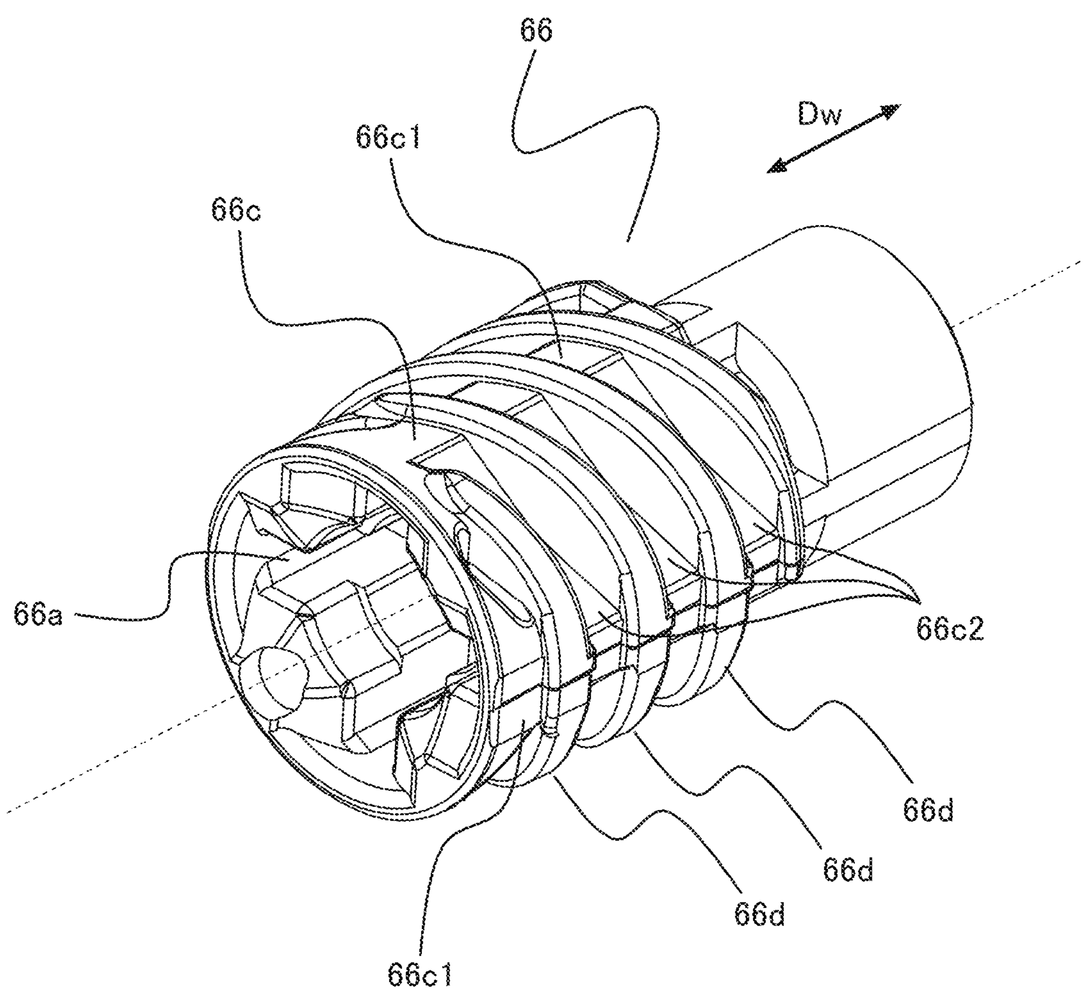
FIG. 7 is a perspective view illustrating a coupling member according to the embodiment.
Figure 8A:
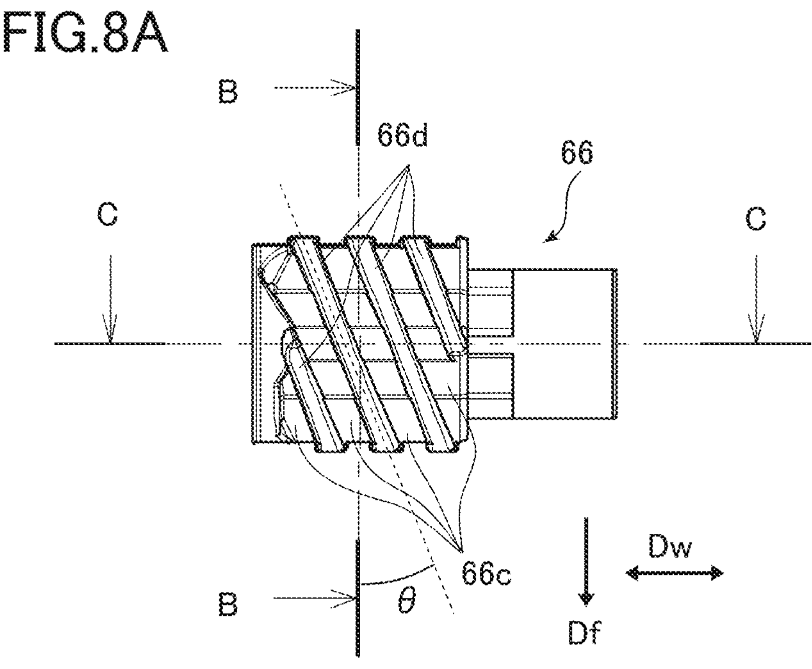
FIGS. 8A to 8D are explanatory diagrams illustrating the coupling member according to the embodiment.
Figures 8B, 8C:
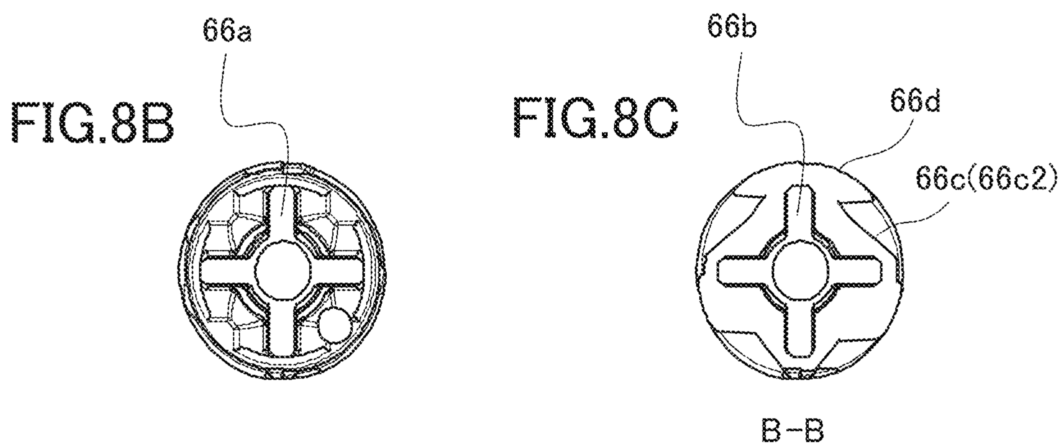
Figure 8D:
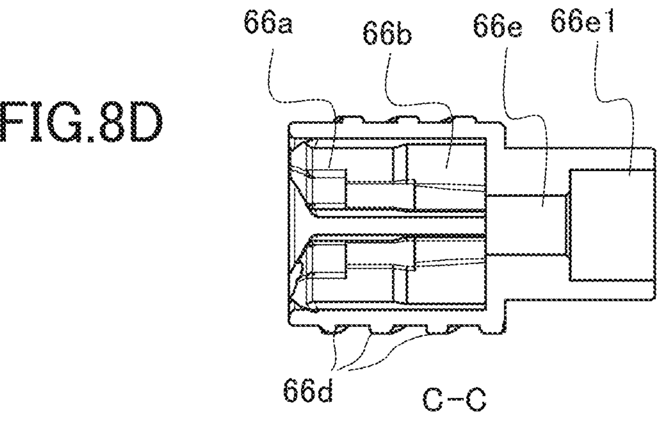

Using FIGS. 7 and 8A to 8D, a shape of the coupling member 66 will be described in detail. FIG. 7 is a perspective view illustrating the coupling member 66. FIG. 8A is a diagram illustrating the coupling member 66 as viewed from a direction perpendicular to the axial direction of the coupling member 66. FIG. 8B is a diagram illustrating the coupling member 66 as viewed from the left side of FIG. 8A in the sheet width direction Dw. FIG. 8C is a cross-sectional view illustrating the coupling member 66 taken along the line B-B of FIG. 8A. FIG. 8D is a cross-sectional view illustrating the coupling member 66 taken along the line C-C of FIG. 8A.

In the following description, the rotational axial direction of the coupling member 66 is simply referred to as the axial direction. The axial direction of the coupling member 66 is substantially the same as the sheet width direction Dw in a state in which the coupling member 66 is assembled into the ADF 102.

As illustrated in FIGS. 7 and 8A to 8D, the coupling member 66 is a substantially cylindrical member including the first cross groove 66*a*, the second cross groove 66*b*, a non-circular outer surface 66*c*, ribs 66*d*, and a shaft hole 66*e*.

The non-circular outer surface 66*c* and the ribs 66*d* are formed on an outer side of the coupling member 66. The shaft hole 66*e* and the first and second cross grooves 66*a* and 66*b* are formed on an inner side of the coupling member 66.

The shaft hole 66*e* is a hole through which the drive shaft 68 is inserted. In the coupling member 66, an inner surface of the shaft hole 66*e* is supported by the outer surface of the drive shaft 68. In addition, in this embodiment, the shaft hole 66*e* and the first and second cross grooves 66*a* and 66*b* are continuously arranged to penetrate through the inside of the coupling member 66 in the axial direction.

Part of the shaft hole 66*e* is formed as a large diameter portion 66*e*1 (FIG. 8D) with an internal diameter larger than an outer diameter of the drive shaft 68. The large diameter portion 66*e*1 is capable of accommodating an urging member (coil spring) that urges the coupling member 66 to the left side of FIG. 6 in the sheet width direction Dw to press the coupling member 66 against the end portion of the feed roller shaft 46.

The first cross groove 66*a* is a groove shape formed to extend radially in a cross shape from the center of the coupling member 66 when viewed in the axial direction. The first cross groove 66*a* is a first groove portion that engages with the spring pin 47 (first engagement portion) described above in the case where the conveyance roller unit 40 is attached to the opening/closing cover 315.

The second cross groove 66*b* is a groove shape formed to extend radially in a cross shape from the center of the coupling member 66 when viewed in the axial direction. The second cross groove 66*b* is a second groove portion that engages with the parallel pin 74 (FIG. 6), described above, disposed at the end portion of the drive shaft 68.

The non-circular outer surface 66*c* includes a non-circular outer surface formed in a shape (in this embodiment, substantially cross chape when viewed in the axial direction) that follows the first and second cross grooves 66*a* and 66*b*, which are cross shapes when viewed in the axial direction. The non-circular outer surface 66*c* in this embodiment includes a plurality of ridge portions 66*c*1 that are positioned on extended lines of the first cross groove 66*a* and extend in the axial direction, and recessed portions 66*c*2 formed between adjacent ridge portions 66*c*1 (FIG. 7). Each of the ridge portions 66*c*1 is positioned on extended lines of the second cross grove 66*b*. The recessed portions 66*c*2 are recessed toward the center of the coupling member 66 compared to the ridge portions 66*c*1. In addition, in this embodiment, the non-circular outer surface 66*c* includes four ridge portions 66*c*1 and four recessed portions 66*c*2, which are alternately arranged in a rotational direction of the coupling member 66. A distance from the center of the coupling member 66 (rotational axis of the feed roller shaft 46) to the ridge portion 66*c*1 is larger than a distance from the center of the coupling member 66 to the bottom of the recessed portion 66*c*2 (center of each recessed portion 66*c*2 in the rotational direction of the coupling member 66).

To be noted, instead of the first cross groove 66*a*, an I-shaped groove capable of engaging with the spring pin 47 could be formed. In such a case, the non-circular outer surface 66*c* on an outer side of the first cross groove 66*a* is formed substantially in an I-shape. In addition, instead of the second cross groove 66*b*, an I-shaped groove capable of engaging with the parallel pin 74 could be formed. In such a case, the non-circular outer surface 66*c* on an outer side of the second cross groove 66*b* is formed substantially in an I-shape.

In this embodiment, by configuring the first groove portion, which engages with the spring pin 47 (first engagement portion), as the cross shaped first cross groove 66*a*, during an attaching operation of the conveyance roller unit 40, described below, it becomes easier to align a phase of the feed roller shaft 46 with respect to the coupling member 66.

The ribs 66*d* are formed to create the outermost circumference of the coupling member 66. That is, the ribs 66*d* are formed such that ridge lines of the ribs 66*d* project further toward the outer side of the coupling member 66 than the non-circular outer surface 66*c*. Therefore, in a case where the coupling member 66 is viewed in the axial direction, a contour of the coupling member 66, formed by the ridge lines of the ribs 66*d*, becomes circular. An outer diameter of the ribs 66*d* with respect to the center line of the coupling member 66 is smaller than an outer diameter of the feed roller 44.

The ribs 66*d* are formed to incline outward in the sheet width direction Dw with respect to the sheet conveyance direction Df. That is, when viewed from a side of the document conveyance path CP (same viewpoint as in FIG. 5), the ribs 66*d* are inclined with respect to the sheet conveyance direction Df such that each rib 66*d* become more distant (toward right side in FIG. 5) from a center 44C of the feed roller 44 in the sheet width direction Dw as the rib 66*d* extends downstream in the sheet conveyance direction Df.

Here, the center 44C of the feed roller 44 refers to a central position in the sheet width direction Dw of an outer surface of the feed roller 44 (the surface that comes into contact with the document to be conveyed). In this embodiment, the center 44C of the feed roller 44 in the sheet width direction Dw is aligned with a conveyance center line, which serves as a reference for the position of the document in the sheet width direction Dw. To be noted, the ADF 102 of this embodiment is a center-referenced sheet conveyance device configured to convey the document by aligning the position of the document in the sheet width direction Dw with the conveyance center line.

An inclination angle θ (FIG. 8A) of the rib 66*d* with respect to the sheet conveyance direction Df is set to, for example, be equal to or more than 10 degrees and equal to or less than 50 degrees, and is preferably set to be equal to or more than 21 degrees and equal to or less than 30 degrees. In one embodiment of this embodiment, the inclination angle θ is 23 degrees. The inclination angle θ of the rib 66*d* refers to an angle between a tangent direction of the ridge line of the rib 66*d* at the point where the ridge line of the rib 66*d* intersects with a center line of the coupling member 66 and the sheet conveyance direction Df, when viewed from a direction perpendicular to both the sheet conveyance direction Df and the sheet width direction Dw.

In a case where the inclination angle θ of the rib 66*d* is small, when a pitch of the helically formed ribs 66*d* becomes narrower, an outer surface of the coupling member 66 becomes substantially closer to a cylindrical surface. Therefore, in the case where the inclination angle θ of the rib 66*d* is small, the ribs 66*d* are aligned at a short pitch along the axial direction, and there is a possibility that a demolding process during resin molding may become difficult. On the other hand, in a case where the inclination angle θ of the rib 66*d* is too large, a leading edge of the document may catch on side surfaces of the ribs 66*d*, and there is a possibility that conveyance failure may occur even with the arrangement of the ribs 66*d*. In addition, by setting the inclination angle θ of the rib 66*d* to an appropriate degree (for example, equal to or more than 21 degrees and equal to or less than 30 degrees), as described below, it is possible to lift a folded edge of the document by the ribs 66*d*.

In this embodiment, three ribs 66*d* are formed in the coupling member 66. By employing a multi-thread winding configuration with a plurality of threads for the ribs 66*d* formed in parallel, each rib 66*d* can be appropriately inclined, while maintaining the spacing between the adjacent ribs 66*d* to be not excessively wide. For example, in a case where the coupling member 66 includes only one rib 66*d*, if an appropriate inclination is to be given to the rib 66*d*, the pitch of the rib 66*d* (spacing between adjacent ridge lines of the rib 66*d*) becomes wider. In such a case, the leading edge of the document might enter between the ridge lines of the rib 66*d*, and could come into contact with the non-circular outer surface 66*c*. Therefore, there is a possibility that achieving a conveyance failure reduction effect offered by the rib 66*d* may become difficult. In this embodiment, by arranging three threads for the ribs 66*d*, it is possible to appropriately incline the ribs 66*d* and reduce the pitch of the ribs 66*d*.

To be noted, the number of threads for the ribs 66*d* is not limited to three, and two or equal to or more than four are also acceptable. In addition, in a case where the pitch of the rib 66*d* can be allowed to be slightly increased, the coupling member 66 may be configured to have only one rib 66*d*.

In this embodiment, each rib 66*d* is formed in a helical shape that makes at least one rotation around the center line (rotational axis) of the coupling member 66. In other words, in a case where the coupling member 66 is viewed in the axial direction, a rotational angle of a range in which the rib 66*d* is disposed with respect to the center line of the coupling member 66 is equal to or more than 360 degrees. By forming the rib 66*d* to completes at least one revolution around the outer circumference of the coupling member 66, it is possible to reduce the likelihood of the leading edge of the document catching on an end portion of the ridge line of the rib 66*d*.

The coupling member 66 may be a resin molded product in which each part (66*a* to 66*e*) is integrally formed by methods such as injection molding. For example, one side of a divided shape of an outer surface configuration (non-circular outer surface 66*c* and ribs 66*d*) of the coupling member 66, which is divided by a plane passing through the center axis of the coupling member 66, is formed by a movable mold, and the other side of the divided shape is formed by a fixed mold. In addition, an inner surface shape of the coupling member 66 (first and second cross grooves 66*a* and 66*b*) is formed using a slide core that slides in the axial direction of the coupling member 66. In this case, since both the first and second cross grooves 66*a* and 66*b* are cross shapes and continuous in the axial direction, the first and second cross grooves 66*a* and 66*b* can be formed with a single slide core, and the slide core can be demolded without difficulty. In other words, according to this embodiment, the coupling member 66 can be molded into a desired shape using conventional demolding methods. To be noted, the coupling member 66 may be an assembly of a plurality of components.

Mounting/Detaching Method of Conveyance Roller Unit

Figure 9:
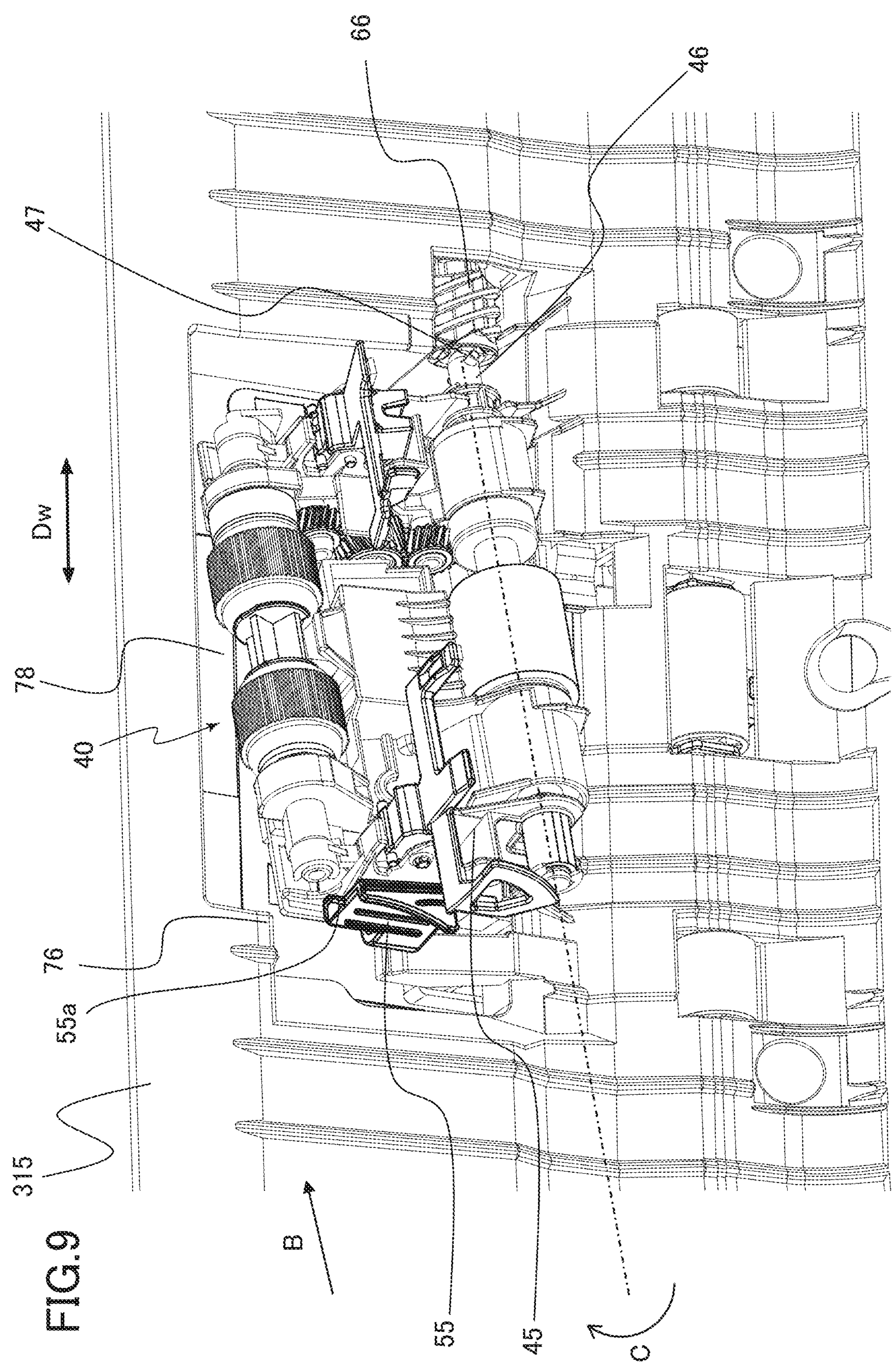
FIG. 9 is a diagram illustrating a method for attaching and detaching the conveyance roller unit according to the embodiment.

Next, using FIGS. 9 and 10, an attaching/detaching method of the conveyance roller unit 40 will be described. FIGS. 9 and 10 are diagrams illustrating an opening state of the opening/closing cover 315 as viewed from a side of the guide surface 315*g*.

As illustrated in FIG. 9, in a case of attaching the conveyance roller unit 40 onto the opening/closing cover 315, first, the user engages the end portion of the feed roller 46 with the coupling member 66. Next, as illustrated in FIG. 10, the user pivots the conveyance roller unit 40 to be pushed into the recessed portion 78 using the coupling member 66 as a fulcrum. Then, the conveyance roller unit 40 is positioned by the shaft-receiver support portion 65 and the projection portions 77 described above, and is brought into a state of being held by the shaft-receiver pinch portion 64 and the separation arm retaining portion 76, serving as a holding means. Thus, the attaching of the conveyance roller unit 40 is completed.

The attaching method of the conveyance roller unit 40 will be described in more detail. First, to secure the conveyance roller unit 40, while pressing the separation arm 55, grip the holder member 45. As an example, while pressing the separation arm 55 with a right thumb, grip a part of the holder member 45 with an index finger. Thereby, the separation arm 55 is elastically deformed in the arrow B direction.

In this state, as illustrated in FIG. 9, the user inserts the end portion of the feed roller shaft 46 (spring pin 47) into the coupling member 66. At this time, the user can visually confirm the engagement of the spring pin 47 with the first cross groove 66*a* of the coupling member 66. In a case where there is an issue with the engagement due to rotational phase misalignment between the feed roller shaft 46 and the coupling member 66, the user aligns the rotational phase of the feed roller shaft 46 with the coupling member 66, and then engages the spring pin 47 with the coupling member 66. A method for aligning the rotational phase may involve rotating the feed roller shaft 46 or the feed roller 44 with fingers, or tilting the entire conveyance roller unit 40. By engaging the spring pin 47 with the first cross groove 66*a* of the coupling member 66 through this process, the drive shaft 68 and the feed roller shaft 46 are connected via the coupling member 66.

At the point when the spring pin 47 is engaged with the first cross groove 66*a* of the coupling member 66, as illustrated in FIG. 9, the other end side in the axial direction of the feed roller shaft 46 (opposite side of the spring pin 47) is separated from the opening/closing cover 315. The user pivots the conveyance roller unit 40 in an arrow C direction using the coupling member 66 as a fulcrum, to push the conveyance roller unit 40 into the recessed portion 78.

As illustrated in FIG. 10, by the pivot of the conveyance roller unit 40, the first shaft receiving portion 46*a* disposed at the end portion on the other side of the feed roller shaft 46 engages with the shaft-receiver support portion 65 of the opening/closing cover 315. In addition, the projection portions 77 (FIG. 5) of the opening/closing cover 315 engages with the groove shape of the holder member 45. Thereby, the conveyance roller unit 40 is positioned in the sheet conveyance direction Df and the sheet width direction Dw.

In addition, concurrently with the above operation, the first shaft receiving portion 46*a* passes through the inlet of the shaft-receiver pinch portion 64 while elastically deforming to expand the shaft-receiver pinch portion 64, and is held inside of the shaft-receiver pinch portion 64. Further, when the user releases the finger from the separation arm 55, the separation arm 55 returns from the elastically deformed state, and the engaged portion 55*a* of the separation arm 55 engages with the separation arm retaining portion 76. When the shaft-receiver pinch portion 64 pinches the first shaft receiving portion 46*a* and the separation arm retaining portion 76 retains the engaged portion 55*a*, the conveyance roller unit 40 is held by the opening/closing cover 315 in a state of being restricted from moving in a direction (toward the front side in FIG. 10) away from the recessed portion 78.

Through the procedures described above, the conveyance roller unit 40 is attached to the opening/closing cover 315.

In a case of detaching the conveyance roller unit 40 from the opening/closing cover 315, the above procedures can be executed in reverse order. That is, the user detaches the engaged portion 55*a* from the separation arm retaining portion 76 by pressing the separation arm 55 of the conveyance roller unit 40, which is attached to the opening/closing cover 315. By pivoting the conveyance roller unit 40 in that state in a direction (opposite to the arrow C direction in FIG. 9) away from the recessed portion 78 using the coupling member 66 as a fulcrum, the user detaches the conveyance roller unit 40 from the shaft-receiver pinch portion 64, the shaft-receiver holding portion 65, and the projection portions 77. Then, the user completes the detachment of the conveyance roller unit 40 by detaching the end portion (spring pin 47) of feed roller shaft 46 from the coupling member 66.

Summary of this Embodiment

In the case where at least part of the coupling member 66 is exposed to the document conveyance path CP, if the rib 66*d* is not provided, there is a possibility that the leading edge of the document may catch on the non-circular outer surface 66*c*. In other words, a rotational radius of at least part of the non-circular outer surface 66*c* (particularly, the recessed portion 66*c*2) with respect to the rotational axis of the feed roller shaft 46 is smaller than the outer diameter of the feed roller 44. Therefore, in the case where the feed roller 44 is rotatably driven, the moving velocity of at least part of the non-circular outer surface 66*c* becomes slower than the peripheral velocity of the feed roller 44. In other words, the moving velocity of at least part of the non-circular outer surface 66*c* is slower than the moving velocity of the leading edge of the document which is conveyed by the feed roller 44. Then, when the leading edge of the document, which is conveyed by the feed roller 44, catches on the non-circular outer surface 66*c* of the coupling member 66 at a position away from the feed roller 44 in the sheet width direction Dw, a force that attempts to swivel the document is generated.

There is a possibility that this force could cause the conveyance failure such an inclination and jam of the document. Even in a case where the non-circular outer surface 66*c* is shaped in contours other than a substantially cross shape, there is a possibility of the conveyance failure occurring for similar reasons in a case where the coupling member 66 has a non-circular contour in the axial view.

In particular, depending on the size of the document, there are cases where a corner portion of the document (leading edge and side edge corner portion of the document) passes through a position of the coupling member 66. In this case, when the document in a folded corner state (a state in which the corner is folded toward the coupling member 66) is conveyed, the corner tends to easily come into contact with the non-circular outer surface 66*c*, and the likelihood of the conveyance failure increases.

In contrast, according to this embodiment, the rib 66*d* that extends in the direction inclined outward in the sheet width direction Dw toward the downstream side in the sheet conveyance direction Df when viewed from the side of the document conveyance path CP, is formed on the outer portion of the coupling member 66. By this rib 66*d*, it is possible to prevent the leading edge of the document from catching on the non-circular outer surface 66*c* of the coupling member 66. In particular, even in the case where the document has the folded corner, the corner portion of the document comes into contact with the rib 66*d* which projects further to the outer side than the non-circular outer surface 66*c*. At that time, the rib 66*d*, which is inclined outward in the sheet width direction Dw toward the downstream side in the sheet conveyance direction Df, guides the document such that the corner portion, which is in the folded state, is pushed to be expanded outward in the sheet width direction Dw. In other words, by inclining the rib 66*d*, it is possible to lift the corner portion of the document whose corner portion is in the folded state. Therefore, it is possible to pass the document through the coupling member 66 without allowing the corner portion of the document to come into with the non-circular outer surface 66*c*. That is, the rib 66*d* serves as a wall portion that guides the edge portion of the document outward in the sheet width direction Dw.

Therefore, according to this embodiment, it is possible to provide the sheet conveyance apparatus, the image reading apparatus, and the image forming apparatus that can reduce the occurrence of the conveyance failure.

In addition, according to this embodiment, in the state in which the opening/closing cover 315 (support unit) is in the opening state, the conveyance roller unit 40 is attached to and detached from the opening/closing cover 315. Therefore, in the case of attaching the conveyance roller unit 40, the user can insert the end portion of the feed roller shaft 46 into the coupling member 66 while visually inspecting the coupling member 66 that is exposed from the guide surface 315*g*. Therefore, it is possible to easily and visually recognize the position into which the feed roller shaft 46 is to be inserted, and, thereby, is possible to improve the workability of the attaching operation. In addition, it is possible to more easily align the rotational phase of the feed roller shaft 46 with respect to the coupling member 66.

Other Embodiments

In the embodiment described above, the rib 66*d*, which is inclined outward in the sheet width direction Dw, is formed on the outer portion of the coupling member 66. Instead of this, for example, a variant example in which the rib 66*d* is formed as a ring shape parallel to the sheet conveyance direction Df, or a variant example in which the rib 66*d* is inclined inward toward the sheet width direction Dw can be considered. Since, also in these examples, the contour of the coupling member 66 becomes circular when viewed in the sheet width direction Dw, it is possible to reduce the likelihood that the leading edge of the document catches on the non-circular outer surface 66*c*. However, since, in these examples, it is not possible to lift the corner position in a case of conveying the document with the folded corner, the ribs 66*d* that is inclined outward in the sheet width direction Dw as in the embodiment described above may be used.

In addition, even in a case where the outer portion of the coupling member 66 is configured to be a cylindrical shape, the same advantage as the variant examples described above can be achieved. However, the limitation of not being able to lift the corner of the document in the folded state is still the same. In addition, in the case where the outer portion of the coupling member 66 is configured to be the cylindrical shape, a significant difference in the wall thickness of the coupling member 66 occurs between an extending direction of the first and second cross grooves 66*a* and 66*b*, and other directions. Therefore, due to shrinkage during the resin molding, there is a possibility that dimensional accuracy on the inner side of the coupling member 66 may decrease. According to this embodiment, since the rib 66*d* is formed while retaining the non-circular outer surface 66*c* that follows the first and second cross grooves 66*a* and 66*b*, a reduction in the dimensional accuracy can be avoided.

In the embodiment described above, the coupling member 66 secured to the drive shaft 68 of the opening/closing cover 315 is engaged with the end portion of the feed roller shaft 46 of the conveyance roller unit 40. Instead of this, a coupling member secured to the feed roller shaft 46 may be engaged with the end portion of the drive shaft 68. Also in this case, if at least part of the coupling member is exposed to the document conveyance path CP, by disposing the rib 66*d* similar to the embodiment described above, it is possible to attain similar advantages to the embodiment described above. To be noted, in the embodiment described above, there is an advantage that allows the user to engage the end portion of the feed roller shaft 46 with the coupling member 66 while visually inspecting the first cross groove 66*a* inside of the coupling member 66.

In the embodiment described above, this technology is applied to the ADF 102 which is the sheet conveyance apparatus conveying the document in the image reading apparatus 101. It is not limited to this, and this technology may, for example, be applied to a sheet conveyance apparatus that conveys a sheet, used as the recording material, in an image forming apparatus. In addition, the “roller member” and the “roller unit” are not limited to the feed roller 44 arranged downstream of the pickup roller 43 and the conveyance roller unit 40 including the pickup roller 43 and the feed roller 44.

According to the present disclosure, it is possible to provide the sheet conveyance apparatus, the image reading apparatus, and the image forming apparatus that can reduce the occurrence of the conveyance failure.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

This application claims the benefit of Japanese Patent Application No. 2024-090563, filed Jun. 4, 2024, which is hereby incorporated by reference herein in its entirety.

What is claimed is:

1. A sheet conveyance apparatus comprising:

a support unit including a guide surface configured to form a conveyance path through which a sheet passes;

a roller unit including a roller member configured to convey the sheet in a sheet conveyance direction through the conveyance path and a roller shaft supporting the roller member, the roller unit being supported by the support unit in a detachable manner;

a drive shaft provided in the support unit;

a coupling configured to connect the drive shaft and the roller shaft; and a motor configured to supply a drive force to the roller shaft via the drive shaft and the coupling, wherein at least part of the coupling is exposed to the conveyance path, wherein a rib is disposed on an outer surface of the coupling, and wherein, when the coupling is viewed from the conveyance path, the rib is inclined with respect to the sheet conveyance direction such that the rib becomes more distant from the roller member in a sheet width direction perpendicular to the sheet conveyance direction as the rib extends downstream in the sheet conveyance direction.

2. The sheet conveyance apparatus according to claim 1, further comprising:

a main unit configured to support the support unit, wherein the support unit is movable with respect to the main unit between a closed position, in which the conveyance path is formed between the guide surface and the main unit, and an open position in which the conveyance path is opened, and wherein, in a state in which the support unit is in the open position, the roller unit is attachable to and detachable from the support unit.

3. The sheet conveyance apparatus according to claim 1, wherein the coupling is attached to the drive shaft.

4. The sheet conveyance apparatus according to claim 3, wherein the roller shaft is provided with a first engagement portion that is disposed at an end portion of the roller shaft and projects outward from an outer surface of the roller shaft, wherein the coupling includes a first groove portion that is formed on an inner side of the coupling and is configured to be engaged with the first engagement portion, wherein an outer surface of the coupling includes a plurality of ridge portions, which are disposed on an extended line of the first groove portion when viewed in the sheet width direction and extend in the sheet width direction, and a recessed portion which is disposed between the plurality of ridge portions and is recessed toward a center of the coupling compared to the plurality of ridge portions, and wherein the rib projects toward an outer side of the coupling compared to the ridge portions.

5. The sheet conveyance apparatus according to claim 4, wherein the first groove portion is formed in a cross shape when viewed in the sheet width direction.

6. The sheet conveyance apparatus according to claim 4, wherein the first engagement portion includes a pin inserted into a hole formed in the roller shaft.

7. The sheet conveyance apparatus according to claim 4, wherein the support unit includes a pinch portion that is configured to pinch the roller unit and is disposed at a different position from the coupling in the sheet width direction, and wherein after the first engagement portion is engaged with the first groove portion, the roller unit is configured to be pinched by the pinch portion by being pivoted about the coupling as a fulcrum.

8. The sheet conveyance apparatus according to claim 7, wherein the roller unit includes an operation portion that is configured to be elastically deformed when operated by a user, and wherein the pinch portion includes a retaining portion that is configured to retain a part of the operation portion and is configured to allow the part to be released from the retaining portion when the operation portion is elastically deformed.

9. The sheet conveyance apparatus according to claim 7, wherein the roller unit includes a shaft receiving portion configured to receive the roller shaft in a rotatable manner, and wherein the pinch portion is configured to pinch the shaft receiving portion.

10. The sheet conveyance apparatus according to claim 3, wherein the drive shaft is provided with a second engagement portion that is disposed at an end portion of the drive shaft and projects outward from an outer surface of the drive shaft, wherein the coupling includes a second groove portion that is formed on an inner side of the coupling and is configured to engage with the second engagement portion, wherein an outer surface of the coupling includes a plurality of ridge portions, which are disposed on an extended line of the second groove portion when viewed in the sheet width direction and extend in the sheet width direction, and a recessed portion which is disposed between the plurality of ridge portions and is recessed toward a center of the coupling compared to the plurality of ridge portions, and wherein the rib projects toward an outer side of the coupling compared to outer surfaces of the ridge portions.

11. The sheet conveyance apparatus according to claim 10, wherein the second groove portion is formed in a cross shape when viewed in the sheet width direction.

12. The sheet conveyance apparatus according to claim 10, wherein the second engagement portion includes a pin inserted into a hole formed in the drive shaft.

13. The sheet conveyance apparatus according to claim 1, wherein the rib is formed in a helical shape that makes at least one rotation around a rotational axis of the coupling.

14. The sheet conveyance apparatus according to claim 1, wherein an outer diameter of the rib with respect to a center of the coupling is smaller than an outer diameter of the roller member.

15. The sheet conveyance apparatus according to claim 1, wherein the coupling includes a plurality of threads of ribs, which include the rib, formed parallel to each other on the outer surface.

16. The sheet conveyance apparatus according to claim 1, wherein an inclination angle of the rib with respect to the sheet conveyance direction is equal to or more than 10 degrees and equal to or less than 50 degrees.

17. The sheet conveyance apparatus according to claim 1, further comprising:

a sheet support portion on which the sheet is supported; and a separation member that is configured to form a nip portion by coming into contact with the roller member and is configured to separate the sheet, which is fed from the sheet support portion, from an other sheet by applying a friction force to the other sheet in the nip portion.

18. An image reading apparatus comprising:

a support unit including a guide surface configured to form a conveyance path through which a sheet passes;

a roller unit including a roller member configured to convey the sheet in a sheet conveyance direction through the conveyance path and a roller shaft supporting the roller member, the roller unit being supported by the support unit in a detachable manner;

a drive shaft provided in the support unit;

a coupling configured to connect the drive shaft and the roller shaft;

a motor configured to supply a drive force to the roller shaft via the drive shaft and the coupling; and a read sensor configured to read an image of the sheet conveyed by the roller member, wherein at least part of the coupling is exposed to the conveyance path, wherein a rib is disposed on an outer surface of the coupling, and wherein, when the coupling is viewed from the conveyance path, the rib is inclined with respect to the sheet conveyance direction such that the rib becomes more distant from the roller member in a sheet width direction perpendicular to the sheet conveyance direction as the rib extends downstream in the sheet conveyance direction.

19. An image forming apparatus comprising:

a support unit including a guide surface configured to form a conveyance path through which a sheet passes;

a roller unit including a roller member configured to convey the sheet in a sheet conveyance direction through the conveyance path and a roller shaft supporting the roller member, the roller unit being supported by the support unit in a detachable manner;

a drive shaft provided in the support unit;

a coupling configured to connect the drive shaft and the roller shaft;

a motor configured to supply a drive force to the roller shaft via the drive shaft and the coupling;

a read sensor configured to read an image of the sheet conveyed by the roller member; and an image forming unit configured to form an image on a recording material based on image information acquired by the read sensor, wherein at least part of the coupling is exposed to the conveyance path, wherein a rib is disposed on an outer surface of the coupling, and wherein, when the coupling is viewed from the conveyance path, the rib is inclined with respect to the sheet conveyance direction such that the rib becomes more distant from the roller member in a sheet width direction perpendicular to the sheet conveyance direction as the rib extends downstream in the sheet conveyance direction.

* * * * *